United States Patent [19]
Busch

[11] Patent Number: 4,582,538
[45] Date of Patent: Apr. 15, 1986

[54] CORROSION INHIBITING COMPOSITION

[76] Inventor: Colin T. Busch, P.O. Box 31, Kawakawa, Bay of Islands, New Zealand

[21] Appl. No.: 640,005

[22] Filed: Aug. 10, 1984

[51] Int. Cl.$^4$ .............................................. C04B 9/02
[52] U.S. Cl. ............................ 106/14.27; 106/14.44; 106/243
[58] Field of Search ............... 106/14.21, 14.25, 14.33, 106/14.39, 14.44, 306, 14.27, 243

[56] References Cited
U.S. PATENT DOCUMENTS 2,818,344 12/1957 Buckman ........................... 106/18.29
3,035,926 5/1962 Larrieu ............................... 106/14.25
4,395,361 7/1983 Eickhoff et al. ..................... 525/17

Primary Examiner—Lorenzo B. Hayes
Attorney, Agent, or Firm—Christie, Parker & Hale

[57] ABSTRACT

A non-toxic corrosion-inhibiting coating composition is disclosed. The composition comprises at least 15% by weight wool grease having a moisture content of less than about 10% and at least 0.1 pounds and preferably from about 0.2 to about 0.6 pounds of barium metaborate per gallon of wool grease in the coating composition. Solvent may be used to adjust the viscosity of the composition.

19 Claims, No Drawings

CORROSION INHIBITING COMPOSITION

FIELD OF THE INVENTION

This invention relates to corrosion-inhibiting coating compositions and more particularly an improved corrosion inhibiting coating composition comprising wool grease.

BACKGROUND OF THE INVENTION

It is well known that moisture, as well as other liquids and gases, e.g., hydrogen sulfide and sulfur dioxide, attack metallic surfaces and cause corrosion in the form of pitting and rust formation. A common method for preventing such corrosion is the application of a coating composition which is impervious to such corrosive fluids over the metal surface. The coating composition acts as a barrier which prevents contact between the metal surface and its corrosive environment.

One type of coating composition known to be useful in protecting metal surfaces is a wax-like coating composition having a lanolin base. Lanolin-based coating compositions exhibit strong adherence to the metal surface, and cracks in the coating do not easily occur.

Lanolin is generally available in either a hydrous form, containing about 25% to 30% water, or in an anhydrous form, typically containing no more than about 0.25% water. It is the anhydrous form of lanolin which is generally used in corrosion inhibiting coating compositions. This is because lanolin tends to be a good solubilizer of oxygen and, if water is present in such compositions, it may be surrounded by oxygen at a concentration greater than that in the water. Under such conditions, if the water is in contact with the metal surface, corrosion is likely to occur.

Lanolin is the refined product of wool grease, the "fat-like" secretion of the sebaceous glands of sheep which is deposited onto the sheep's wool fibers. Lanolin is made up of a complex mixture of esters and polyesters of high molecular weight alcohols and fatty acids.

Unrefined wool grease contains, in addition to the complex mixture of esters and polyesters present in lanolin, free alcohols and fatty acids and water in an amount typically less than about 10% by weight. Because of its relatively high moisture content and the presence of free fatty acids, unrefined wool grease is generally not used in corrosion inhibiting coating compositions.

SUMMARY OF THE INVENTION

It has been found that the addition of barium metaborate to a lanolin-based coating composition substantially enhances the corrosion inhibiting properties of the coating composition. In addition, the presence of barium metaborate increases the tolerance of the coating composition to moisture and free fatty acids, thereby enabling the use of unrefined wool grease, as well as refined wool grease, i.e., lanolin, as the base of a corrosion inhibiting coating composition. Accordingly, the present invention provides a corrosion inhibiting coating composition comprising wool grease and barium metaborate. Solvent is preferably present in the composition to provide a consistency suitable for use as a paint by brushing, spraying or the like onto a metal surface subject to corrosion.

The wool grease may be refined or unrefined but must be substantially anhydrous, having a moisture content preferably below about 10% and more preferably below about 2% by weight. The wool grease is present in the composition, preferably in an amount of at least about 15% by weight and more preferably in an amount of at least 25% by weight of the composition. Barium metaborate is present in the composition in an amount of at least about 0.1 pound per gallon of wool grease and more preferably in an amount of from about 0.2 to about 0.6 pounds per gallon of the wool grease. Solvent, preferably kerosene, is present in an amount of from about 0% to about 83% by weight of the composition, depending on the desired consistency of the composition.

DETAILED DESCRIPTION

In accordance with the present invention, there is provided a non-toxic, corrosion inhibiting coating composition comprising wool grease and barium metaborate. Solvent is preferably present in the composition to facilitate application of the composition by reducing its viscosity.

As used herein, the term "wool grease" is meant to include unrefined wool grease and refined products of wool grease which comprise lanolin, including lanolin itself.

The wool grease is substantially anhydrous, having a water content preferably less than about 10% and more preferably less than about 2% by weight. Wool grease having a lower water content, particularly having a water content less than about 2%, is preferred because it has a greater ability to absorb and suspend moisture present on the surface of the metal to which the coating composition is applied.

The concentrations of wool grease and solvent are selected to provide a coating composition having a consistency at a particular temperature which is suitable for application at that temperature by the desired method, e.g., spraying or brushing.

Wool grease is present in the composition in an amount of at least about 15% and is preferably maintained in the range of from about 25% to about 98% by weight of the composition. Accordingly, solvent is preferably present in the composition in an amount of from about 0% to about 71% by weight of the composition, and may be present in an amount as great as about 81% by weight of the composition.

Within these ranges, compositions having lesser amounts of wool grease and greater amounts of solvent are preferred for spraying. For example, a composition suitable for aerosol spraying comprises equal parts of wool grease and solvent along with a suitable aerosol propellant. Such a composition may be, for example, about 30% by weight wool grease, about 30% by weight solvent, about 0.5 pounds of barium metaborate per pound of wool grease, and the remainder being propellant.

Compositions having greater amounts of wool grease and lesser amounts of solvent are preferred for application methods such as brushing and pouring. For example, a preferred composition for brushing comprises about 86% by weight wool grease, about 0.5 pounds per gallon barium metaborate per gallon of wool grease, and about 10% solvent. Depending on the ambient temperature, the composition may be semi-solid and may need to be heated prior to application to enable the composition to be applied as a liquid.

While coating compositions comprising wool grease in an amount less than about 25% and solvent in an amount greater than about 71% by weight can be used, they are not preferred because the application of such compositions to a reasonable thickness may be limited by running or sagging. Hence, the application of multiple coats may be required to achieve a coating sufficiently thick to provide adequate corrosion inhibiting protection.

The purpose of the solvent is to reduce the viscosity of the composition. Once the composition has been applied, the solvent evaporates to yield a hardened semisolid coating. Hence, the solvent may be any suitable solvent for wool grease. Exemplary solvents suitable for use in the present invention include kerosene, benzene, chloroform, ether, carbon disulfide, acetone, petroleum ether and white spirits. Kerosene and white spirits are presently preferred because of their economy, quick evaporation and high flash-points.

As used herein, "barium metaborate" refers to barium metaborate monohydrate, the only form of barium metaborate known to be commercially available. Such a compound is commerically available from Buckman Laboratories of Memphis, Tenn. under the trade name of Busan 11-M1.

The addition of barium metaborate imparts several unique properties to the coating composition. First, the barium metaborate enhances the corrosion inhibiting properties of the coating composition and increases the effective life of coatings made from the coating composition. Thus, the coating composition of the present invention can be used in more severely corrosive environments than conventional lanolin-based coating compositions and requires less frequent reapplication than with conventional lanolin-based coating compositions.

It has also been found that the addition of barium metaborate to a lanolin-based coating composition enables the composition to tolerate an increased amount of water and/or fatty acids, without a significant loss in the corrosion inhibiting properties of the composition. This feature enables the use of unrefined wool grease as the base of the coating composition in lieu of the more expensive refined wool grease, e.g., lanolin.

To impart these properties to the coating composition the barium metaborate is present in the composition in an amount of at least about 0.1 pound per gallon of wool grease and preferably in an amount of from about 0.2 to about 0.6 pounds per gallon of the wool grease.

It has been found that amounts of barium metaborate as little as 0.1 pound per gallon of the wool grease improve the corrosion inhibition properties of coatings formed from such compositions. Such an amount is particularly useful in lanolin-based coating compositions having a moisture content of 2% or less. For those coating compositions having a moisture content greater than about 2%, it is preferred to use greater amounts of barium metaborate, up to about 0.6 pounds per gallon of wool grease in the composition.

While amounts of barium metaborate greater than about 0.6 pounds per gallon of wool grease can be used, an amount of from about 0.2 to 0.6 pounds per gallon of wool grease has been found to be sufficient to compensate for most variations in the water content and fatty acid content of unrefined wool grease. An amount of the barium metaborate of about 0.5 pounds per gallon of wool grease in the coating composition is believed to give the optimum combination of corrosion protection, tolerance to water and fatty acids, and production costs.

In order to impart uniform corrosion inhibiting properties to the coating composition, the barium metaborate must be uniformly dispersed throughout the composition. Accordingly, proper mixing of the components of the coating composition is important.

A preferred method for mixing the various components comprises first heating the wool grease and the solvent to the same temperature, preferably about 120° F. At this temperature, the wool grease is in the liquid state. The barium metaborate is then blended into the solvent. Preferably a medium-shear mixer is used to ensure complete dispersion.

A small portion of the wool grease, preferably about 20% of the total amount of wool grease in the composition, is added to the mixture of solvent and barium metaborate. This is done to assist in maintaining the barium metaborate in suspension.

The mixure is then added to the remainder of the wool grease, which is maintained at the same temperature as the mixture. The composition is then blended, e.g., with a medium-shear mixer to assure uniform dispersion of the barium metaborate. The composition is then cooled with stirring, e.g., with a paddle type stirrer, until the composition cools to a temperature below about 100° F. at which time it is poured into containers for dispensing or for storage.

A variety of other ingredients can be added to the composition for modifying the properties of the coating composition. Ingredients can be added to modify the viscosity or surface tension of the composition, to increase the hardness and impact resistance of coatings made from the composition, to further improve corrosion resistance and the like.

For example, a preferred embodiment of the invention particularly useful as a corrosion inhibiting composition for interior door panels and interior chassis members of automobiles comprises a coating composition having a penetrant which enables the coating composition to spread or migrate into otherwise inaccessible areas such as spot weld seams, metal folds and the like, and a thickening agent.

The presently preferred penetrant is manufactured by Shell Oil Co. and sold under the name Autosave 1894. Autosave 1894 is preferred because it also acts as a moisture dispersant. It has been found that the addition of Autosave 1894 also enhances the corrosion inhibiting properties of the coating composition. It is presently preferred that the concentration of Autosave 1894 be maintained in the range of from about 10% to about 30% by volume of the coating composition, with about 20% by volume being most preferred.

The thickening agent is added to increase the viscosity of the composition. While greater amounts can be used, an amount of about 10 pounds per 100 gallons of coating composition is presently preferred. The presently preferred thickening agent is attapulgus clay. Such a product is commercially available from Englehard Minerals & Chemicals Corporation of New Jersey under the trade name Attagel. Attapulgus clay is preferred as a thickening agent because it not only increases the viscosity of the composition but also increases the impact resistance and enhances the noise insulation properties of coatings made from the coating composition.

While the above coating composition is particularly suitable for interior surfaces of automobiles, it is preferred that exterior surfaces, e.g., exterior chassis members and the underside of fenders, be coated with a composition which forms a harder surface. Therefore, in another preferred embodiment of the invention, addition agents are added to the composition to increase the hardness of the coating. The presently preferred hardener comprises a resin which is added in an amount in the range of from about 8% to about 12% by volume of the composition. Greater amounts tend to create excessive hardening over extended periods. It is preferred that the resin be dissolved in a solvent compatible with the wool grease, e.g., white spirits prior to its addition. Conventional resins used in varnishes are suitable.

It is apparent that other fillers may be added to enhance other selected properties of the composition. For example, polyethylene fiber may be added to enhance the impact resistance of the composition.

The preceding description has been presented with reference to presently preferred embodiments of the invention. Workers skilled in the art and technology to which this invention pertains will appreciate that alterations and changes in the described compositions can be practiced without meaningfully departing from the principles, spirit and scope of this invention. Accordingly, the foregoing description should not be read as pertaining only to the precise compositions described, but rather should be read consistent with and as support for the following claims which are to have their fullest fair scope.

What is claimed is:

1. An anti-corrosion coating composition comprising unrefined wool grease having a moisture content of no more than about 10% and barium metaborate.

2. A coating composition as claimed in claim 1 wherein the wool grease has a moisture content of no more than about 2% by weight.

3. A coating composition as claimed in claim 1 wherein the wool grease is present in an amount of at least about 15% by weight of the composition.

4. A coating composition as claimed in claim 1 wherein the wool grease is present in an amount of from 25% to about 98% by weight of the composition.

5. A coating composition as claimed in claim 1 wherein the barium metaborate is present in an amount of at least about 0.1 pound per gallon of wool grease in the composition.

6. A coating composition as claimed in claim 1 wherein the solvent is present in an amount of from about 0.2 to about 0.6 pounds per gallon of wool grease in the composition.

7. A coating composition as claimed in claim 1 further comprising a solvent in an amount of up to about 81% by weight of the coating composition.

8. A coating composition comprising:
   unrefined wool grease in an amount of from about 25% to about 98% by weight of the composition, said wool grease having a moisture content of no more than about 10%;
   barium metaborate in an amount of at least about 0.1 pound per gallon of wool grease in the composition; and
   a solvent in an amount of from about 0% to about 73% by weight of the composition.

9. A coating composition as claimed in claim 8 wherein the wool grease has a moisture content of no more than about 2% by weight.

10. A coating composition as claimed in claim 8 wherein the wool grease is present as unrefined wool grease.

11. A coating composition as claimed in claim 8 wherein the wool grease is present as lanolin.

12. A coating composition as claimed in claim 8 wherein the barium metaborate monohydrate is present in an amount of from about 0.2 to about 0.6 pounds per gallon of wool grease in the coating composition.

13. A coating composition as claimed in claim 8 wherein the solvent is kerosene.

14. A coating composition as claimed in claim 8 further comprising a thickening agent.

15. A coating composition as claimed in claim 14 wherein the thickening agent is attapulgus clay.

16. A coating composition as claimed in claim 15 wherein the attapulgus clay is present in an amount of about 10 pounds per 100 gallons of the coating composition.

17. A coating composition comprising:
   unrefined wool grease having a moisture content of less than about 2% by weight in an amount of about 86% by weight of the composition;
   barium metaborate in an amount of about 0.2 to about 0.6 pounds per gallon of wool grease in the composition; and
   solvent in an amount of about 10% by weight of the composition.

18. A coating composition as claimed in claim 17 wherein the solvent is kerosene.

19. A coating composition as claimed in claim 17 wherein the barium metaborate is present in an amount of about 0.5 pounds per gallon wool grease in the composition.

* * * * *